United States Patent [19]
Montesi

[11] 3,877,143
[45] Apr. 15, 1975

[54] PASTRY TOOL OR IMPLEMENT

[75] Inventor: Edward N. Montesi, Barrington, R.I.

[73] Assignee: Dart Industries Inc., Los Angeles, Calif.

[22] Filed: Aug. 5, 1974

[21] Appl. No.: 494,951

[52] U.S. Cl.................... 30/114; 294/1 R; 30/124
[51] Int. Cl............................................. B26b 11/00
[58] Field of Search ............ 30/124, 346, 351, 114, 30/142; 294/1 R, 7

[56] References Cited
UNITED STATES PATENTS

| 1,948,592 | 2/1934 | Nelson | 294/1 R |
| 2,067,247 | 1/1937 | Soteros | 30/124 X |
| 2,294,569 | 9/1942 | Petersen | 294/7 |
| 2,322,046 | 6/1943 | Miller | 30/124 X |
| 2,502,982 | 4/1950 | Norman | 30/124 X |
| 2,539,225 | 1/1951 | Bettencourt | 30/124 X |

Primary Examiner—Donald G. Kelly
Assistant Examiner—J. C. Peters

[57] ABSTRACT

A pastry implement having a blade edge that extends into the handle portion and a discontinuous blade top surface.

8 Claims, 6 Drawing Figures

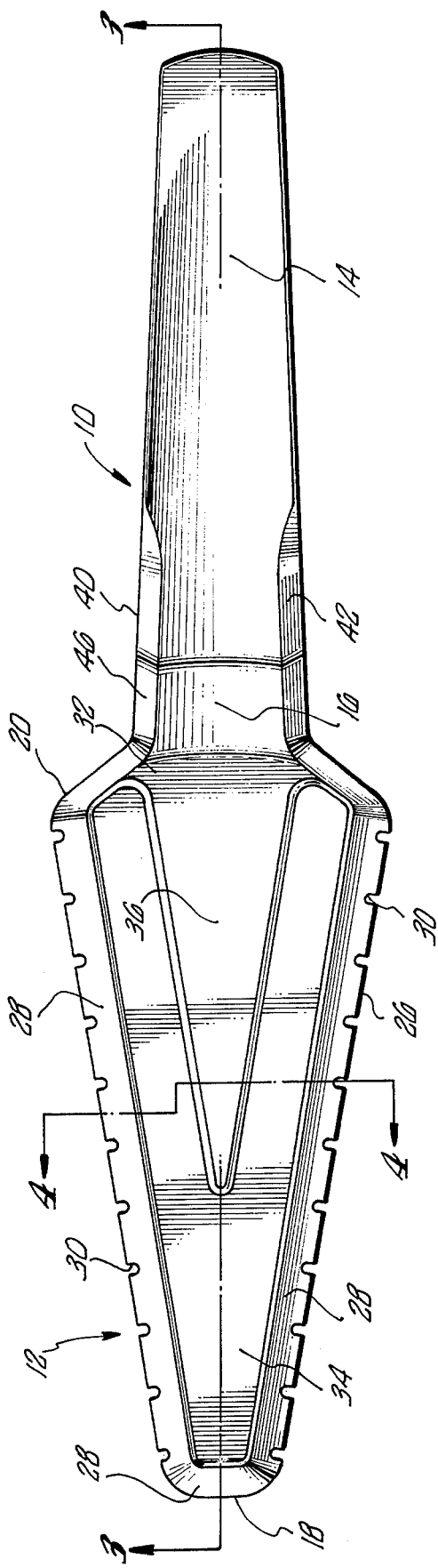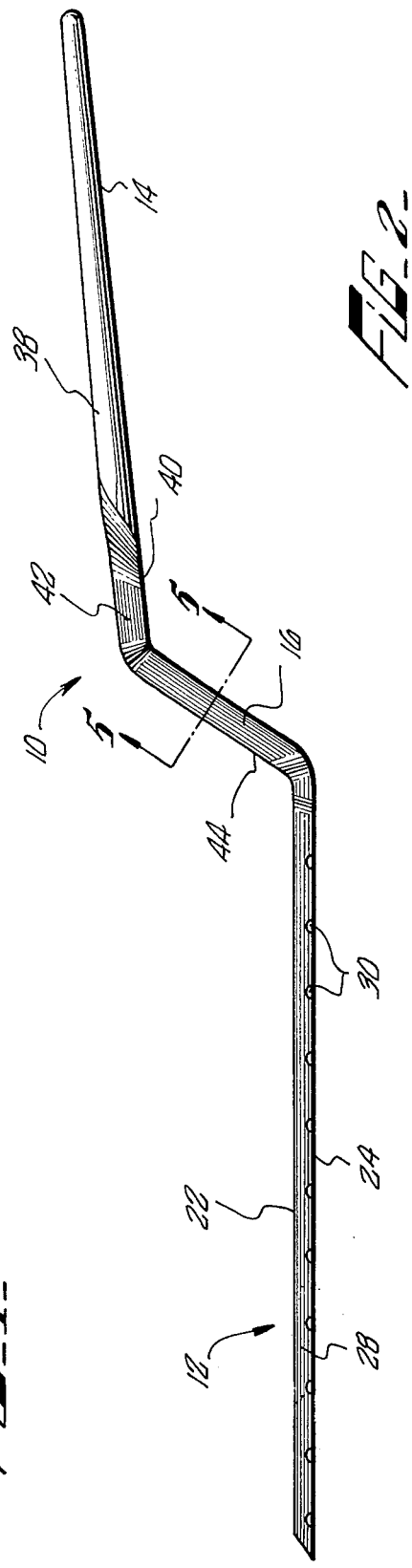

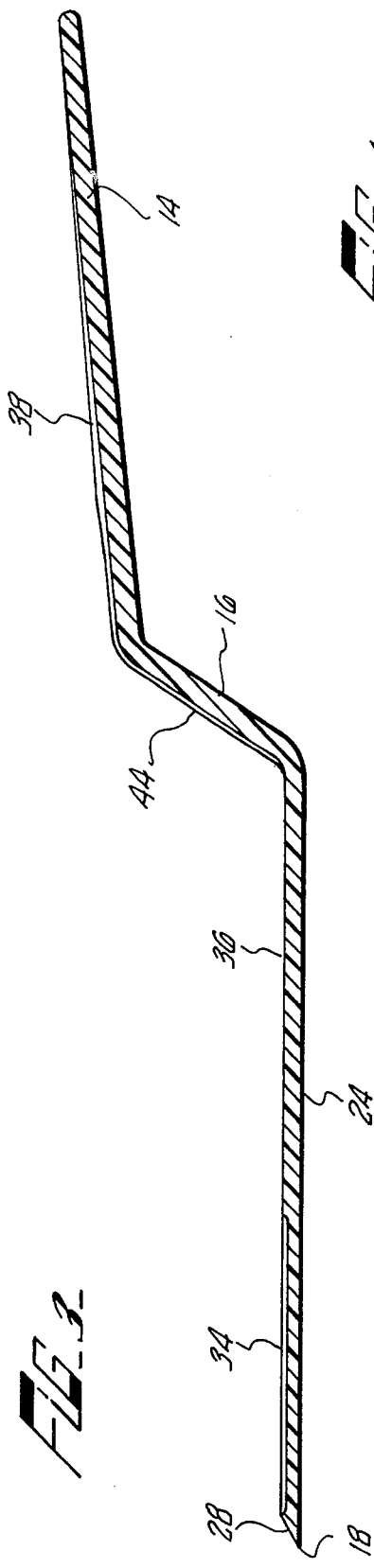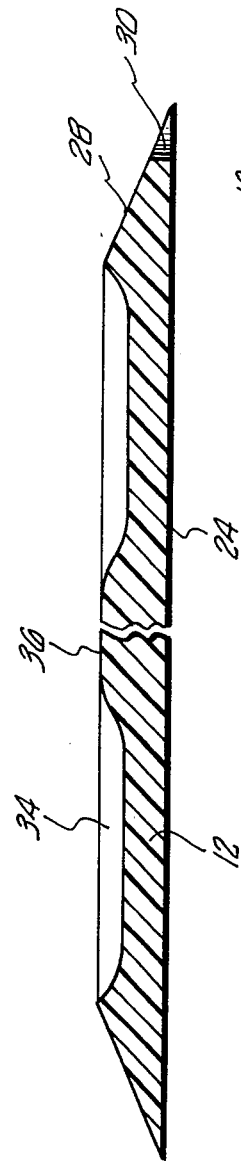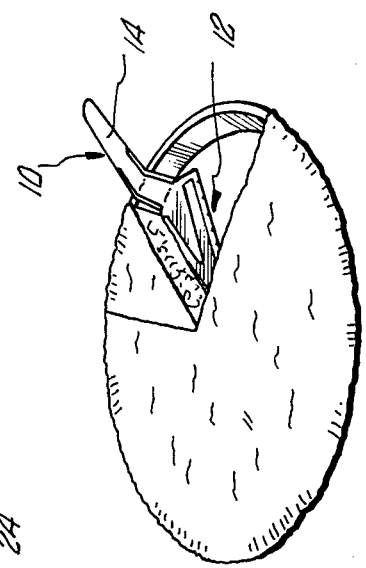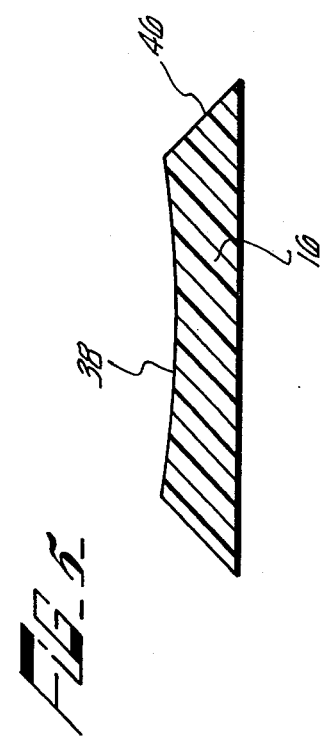

PASTRY TOOL OR IMPLEMENT

This invention relates to a pastry tool or implement that is suitable for use in cutting and serving various pastry products. More particularly, the invention relates to a blade construction on the subject implement that will enable the user to readily and easily separate the pastry product from its container as well as easily release that product as it is placed upon a suitable serving dish.

Prior art pastry tools have, in general, included a blade portion that was segmentally shaped and includes a substantially planar top surface. Such construction, of course, provided for the complete support of commonly divided cake or pie portions. However, the planar/top surface frequently adhered to the product being served, thus complicating the removal of such product therefrom. Similarly, these prior art implements have included an interconnecting element between the supporting blade and the handle member. However, such interconnecting portion has been of little significance to these constructions except to provide an off-set between the aforementioned elements. Accordingly, such have in no fashion provided a mechanism whereby, in particular, a pie product may be separated from the supporting edge of a typical pie pan. Accordingly, the removal of pie products from their containers have been, in many instances, ineffectively and incompletely accomplished with these prior art tools.

The instant invention, among other things, provides for a solution to the above-mentioned problems and, in particular, has as a principal objective the easy and complete removal of typical pastry products from their containers. Such includes the provision of a blade top surface that is discontinuous in nature which in addition includes a serrated type knife edge all around its peripheral edge. Similarly, to enhance the complete end effective removal of pie products, this construction incorporates a beveled edge arrangement along the lateral extent of the interconnecting member between the blade and handle as well as into and along a portion of the handle member itself. This beveled edge area accordingly acts as a continuity of the knife edge on the blade and very effectively separates the pastry product along the container side wall and lip area which is common in pie plate constructions.

Other advantages and objectives will become more apparent to the reader with continued reference to the ensuing specification and drawings wherein:

FIG. 1 is a top plan view of the pastry tool or implement, incorporating the various blade and handle features of the invention;

FIG. 2 is a side elevational view of this pastry cutter or implement;

FIG. 3 is a cross-sectional view thereof taken along line 3—3 of FIG. 1;

FIG. 4 is a cross-sectional view thereof taken along 4—4 of FIG. 1;

FIG. 5 is a similar cross-section taken along line 5—5 of FIG. 2; and

FIG. 6 is a perspective view of the implement showing its relationship with a pastry product contained in a typical pie platter.

With continued reference to the various figures as described above, and in particular with relationship to FIGS. 1, 2 and 6 wherein like reference numerals refer to similar parts of the pastry tool or implement 10, it may be seen that such includes a blade member 12, a handle 14 and an interconnecting element 16 which is integral with both the handle and blade and provides for an off-set between such two elements of the tool. These elements are, of course, characteristic of any such implement of this type. However, the subject device includes variations which are hereinbelow more fully described that make the tool which is the subject of this invention unique and significantly improves its operating characteristics.

The blade 12, as can best be seen in FIG. 1, is segmentally shaped thereby extending from an apex forward end 18 to a generally broad based rearward end 20. It is additionally apparent from FIG. 1 that the apex end 18 is of a blunted nature thus avoiding a dangerous point that might inadvertently cause serious injury to the user. Likewise, as can best be seen by reference to FIG. 2, the blade member 12 includes a top surface 22 and a bottom surface 24 and, of course, a surrounding peripheral edge 26.

The peripheral edge 26 is beveled all around in knife edge like fashion 28. Furthermore, such edge is notched as at 30 to provide for improved cutting characteristics. The notches 30 are equally spaced along the beveled knife edge 28. Further note that the blade and its rearward most end includes a tapering portion 32 that quickly narrows the blade with as it blends into the connector 16. The tapered portion 32 of the blade is similarly beveled along its lateral edges thus continuing the knife like edge all along the blade edge itself.

The bottom surface of the blade 24 is generally planar in nature and this planar configuration extends all along the bottom surfaces of the connector 16 and handle 14. However, it should be noted that the top surface areas of these elements are configured and such is of definite advantage to the user. In particular, note that the top surface 22 of blade 12 includes a recess 34 that is adjacent to and extends along the beveled knife edge 28. This recess 34 is of a substantial width and thereby provides for a discontinuity in the top surface area of the blade. It should further be noted, however, that a recess 34 does not extend entirely across the blade top surface but instead leaves a similar planar surface area 36 that is likewise segmentally shaped. The provision of the noted recess 34 provents a supported pastry product from actively adhering to the top surface of the blade. Accordingly, as the user deposits such pastry product into his intended serving dish, the blade area may easily and effectively be separated from that product.

As can best be seen in FIGS. 2 and 3, the handle 14 protrudes rearwardly from the blade element in an off-set relationship thereto and, of course, functions to provide the user with a ready means for grasping the implement. Such handle 14 has a concave upper surface 38 extending along the longitudinal axis thereof. This concavity provides an excellent area of engagement for the user's finger digits and additionally provides a well-like drainage basin for any liquid substance that may seep or find residence thereon. Similarly, it can be seen that the portions of the handle's lateral edges 40 adjacent the connector 16 are similarly beveled as at 42 to provide a cutting edge along that portion of the handle member. This cutting edge portion is adapted to overlap the horizontal edge of a typical pie pan, FIG. 6, and to effectively separate the pie crust from that portion of the pan.

The connector 16 is concave along its top surface 44 and like the respective blade and handle edges, is beveled as at 46. Accordingly, this portion is readily accommodated along the wall area of a typical pie pan as is seen in FIG. 6 and functions to separate the pie crust from this portion of the pan area.

It may be seen that an implement of this type in its prefered form, includes the beveled knife edge portion that extends from the base portion of the handle means all along the connecting element and along the blade itself to provide an effective knife edge that will remove pies or similar pastry goods from their container means. Furthermore, the top surface area of the blade is discontinuous in nature to effectively prevent the adhesion of that product thereto. It should also be apparent from the various drawings, the implement, in its preferred form, is molded from any suitable plastic material. However, other materials may be effectively used and such, in no way, contributes to the invention.

I claim:

1. A pastry tool for cutting and serving products, particularly pies and including:
   a blade member having top and bottom surfaces and at least two opposed edges each of said edges being beveled to a knife edge, said blade top surface further including peripherally extending recessed portions positioned adjacent the beveled knife edge and extending laterally across said top surface;
   a handle protruding rearwardly from said blade; and,
   an integral connector extending between said blade member and said handle in a distinct angular relationship to each, said connector including along each edge thereof a beveled portion that additionally extends into and partially along the edges of said handle.

2. A culinary implement for cutting and serving pastry products and including:
   a segmentally shaped blade member having top and bottom surfaces and at least two opposed edges each of said edges being beveled to a knife edge, said blade top surface further being similarly segmental in shape but of a smaller size than said blade and further including peripherally extending recessed portions positioned adjacent the beveled knife edge and extending interiorly therefrom;
   a handle protruding rearwardly from said blade member, said handle having a concave top surface and edge portions thereof adjacent said blade that are beveled;
   an integral concave connector extending between said blade member and said handle in a distinct angular relationship to each, said connector including along each edge thereof a bevel that interconnects with the similar beveled edges of said handle and blade.

3. A pastry tool according to claim 1 wherein said blade member is segmentally shaped and includes a rearwardly tapering portion that interengages said connector.

4. A pastry tool according to claim 3 wherein said beveled knife edge includes a plurality of notches spaced therealong.

5. A pastry tool according to claim 2 wherein the forward end of said segmentally shaped blade member is slightly blunted and beveled to a knife edge.

6. A pastry tool according to claim 1 wherein the top surface of said connector is concavely shaped.

7. An implement suitable for cutting and serving pastry products and including:
   a blade member having top and bottom surfaces and at least two opposed edges each of said edges being beveled to a knife edge, said blade top surface further including peripherally extending recessed portions positioned adjacent the beveled knife-edge and extending laterally across said top surface, said bottom surface being substantially planar;
   a handle protruding rearwardly from said blade in an off-set relationship with respect thereto; and,
   an integral concave connector extending between said blade member and said handle in a distinct angular relationship to each, said connector including along each edge thereof a beveled portion that additionally extends into and partially along the edges of said handle.

8. An implement according to claim 7 wherein the bottom surface areas of said concave connector and handle are also substantially planar.

* * * * *